US012646183B2

(12) United States Patent (10) Patent No.: US 12,646,183 B2

Saghiri (45) Date of Patent: Jun. 2, 2026

(54) MULTIPLE OBJECT TRACKING IN A VIDEO STREAM

(71) Applicant: SiliconeSignal Technologies, Meknes (MA)

(72) Inventor: Khalid Saghiri, Meknes (MA)

(73) Assignee: SiliconeSignal Technologies, Meknes (MA)

( * ) Notice: Subject to any disclaimer, the term of this patent is extended or adjusted under 35 U.S.C. 154(b) by 554 days.

(21) Appl. No.: 18/049,804

(22) Filed: Oct. 26, 2022

(65) Prior Publication Data

US 2024/0144485 A1 May 2, 2024

(51) Int. Cl.
| | |
|---|---|
| *G06T 7/246* | (2017.01) |
| *G06V 10/22* | (2022.01) |
| *G06V 10/776* | (2022.01) |

(52) U.S. Cl.
CPC ............ *G06T 7/246* (2017.01); *G06V 10/225* (2022.01); *G06V 10/776* (2022.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 9,443,320 | B1 * | 9/2016 | Gaidon | ............... G06V 10/764 |
| 11,004,209 | B2 | 5/2021 | Chen et al. | |
| 12,183,090 | B2 * | 12/2024 | Agarwal | ............. G06V 10/454 |
| 2007/0218440 | A1 | 9/2007 | Delahunt et al. | |
| 2020/0327465 | A1 * | 10/2020 | Baek | ...................... G16H 50/20 |
| 2020/0380274 | A1 | 12/2020 | Shin et al. | |
| 2023/0154195 | A1 * | 5/2023 | Agarwal | ............. G06V 20/588 |
| | | | | 382/103 |
| 2024/0249342 | A1 * | 7/2024 | Malgarini | ............. G06Q 30/06 |

* cited by examiner

*Primary Examiner* — Vikkram Bali

(74) *Attorney, Agent, or Firm* — Polygon IP, LLP

(57) ABSTRACT

Multiple Object Tracking (MOT) procedures are used to analyze a video stream to identify and track objects and events of interest across frames in the video stream. According to various embodiments, two or more different models may be separately applied to track an object across multiple video frames. A model may be dynamically evaluated for a frame or group of frames by determining a performance metric for the model, for instance on the level of a frame or group of frames. Then, two or more models may be fused together using a weighting scheme based at least in part on performance metrics for the different models. The fused model may be used to track objects across the frames.

17 Claims, 5 Drawing Sheets

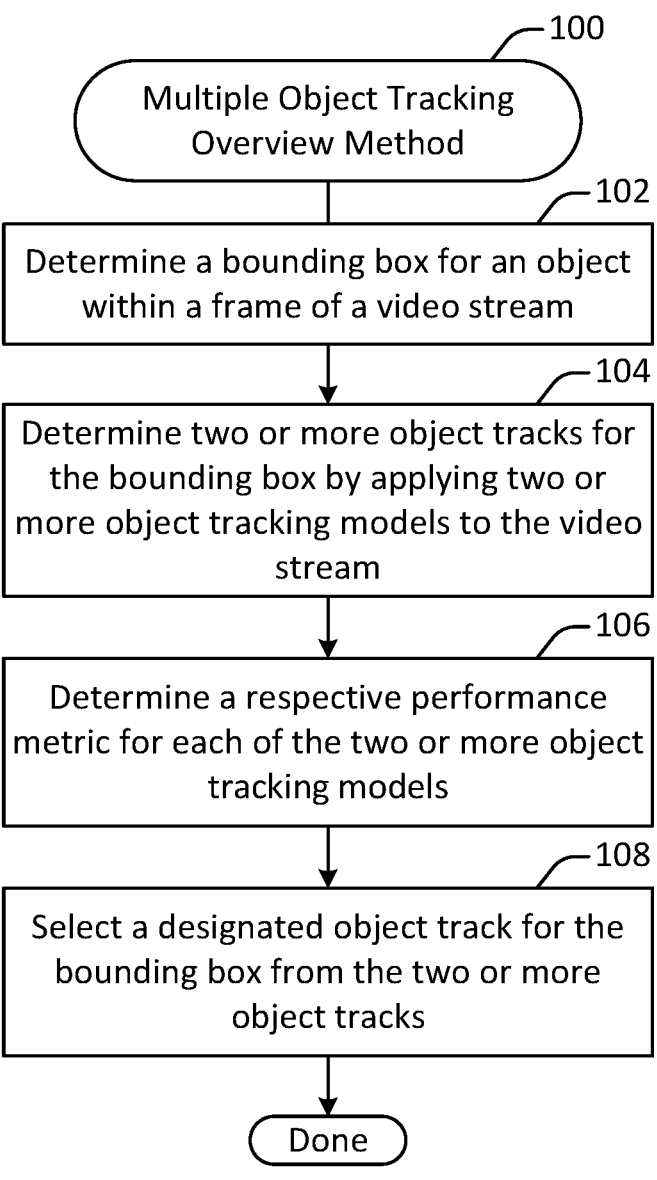

100

Multiple Object Tracking
Overview Method

102

Determine a bounding box for an object
within a frame of a video stream

104

Determine two or more object tracks for
the bounding box by applying two or
more object tracking models to the video
stream

106

Determine a respective performance
metric for each of the two or more object
tracking models

108

Select a designated object track for the
bounding box from the two or more
object tracks Done

Figure 1

System 500

Processor 501

Memory 503

Storage Device 505

Bus 515

Interface 511

MULTIPLE OBJECT TRACKING IN A VIDEO STREAM

FIELD OF TECHNOLOGY

This patent application relates generally to computer vision, and more specifically to the tracking of objects within video data.

BACKGROUND

Identifying objects in a video stream is often a straight-forward task for humans. To a computer system, however, a video stream is a sequence of images, and identifying portions of successive video frames within the video stream that correspond to the same physical object can be a difficult task. Multiple Object Tracking (MOT) procedures are used to analyze a video stream to identify and track objects and events of interest.

The tracking of objects of interest using unsupervised smart cameras or systems is of paramount importance for a range of applications, such as object in-painting to remove an object from a video stream. However, MOT procedures are often a limiting factor in video stream analysis because tracking is difficult and prone to error in complex situations. Errors occurring during the tracking phase can negatively impact subsequent operations related to video analytics, video modification, and video insight generation. Accordingly, improved techniques for multiple object tracking are desired.

SUMMARY

Techniques and methods described herein provide for embodiments of systems, devices, methods, and non-transitory computer readable media having instructions stored thereon for video stream analysis and processing. In some implementations, a bounding box around an object within a designated frame of a plurality of frames within a video stream may be determined. Two or more object tracks for the object may be determined from a plurality of object tracks by applying two or more object tracking models to the video stream, each of the two or more object tracks identifying a correspondence between bounding boxes for the object across different ones of the plurality of frames. A plurality of raw performance metrics may be determined based at least in part on one or more visual features within the designated frame, each of the raw performance metrics corresponding to a respective one of the two or more object tracking models. A designated object track of the two or more object tracks may be selected for the object based at least in part on the plurality of raw performance metrics. The designated object track may be stored on a storage device.

According to various embodiments, a determination may be made as to whether the two or more object tracks are different. The raw performance metrics may be determined when it is determined that the two or more object tracks are different.

In some embodiments, a plurality of normalized performance metrics may be determined based on the raw performance metrics. The normalized performance metrics may be located on a designated performance metric scale.

In some implementations, a plurality of raw cost matrices may be determined for the designated frame. The raw cost matrices corresponding to a respective one of the object tracking models. A designated one of the raw cost matrices may include a plurality of values. Each of the values may correspond with a respective one of the plurality of object tracks and a respective bounding box within the designated frame. A plurality of weighted cost matrices may be determined for the designated frame. Each of the weighted cost matrices may correspond with a respective raw cost matrix and may be weighted based on a respective weighting factor. The weighting factors may be determined based on the plurality of raw performance metrics.

In some embodiments, an object identifier for the bounding box may be determined by applying an object recognition algorithm to all or a portion of the designated frame. The two or more object tracking models may include an appearance-based model. The two or more object tracking models may include a motion-based model. A designated one of the performance metrics may be determined for an individual frame. Alternatively, or additionally, a designated one of the performance metrics is determined for a group of temporally proximate frames.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods, and computer program products for multiple object tracking. These drawings in no way limit any changes in form and detail that may be made by one skilled in the art without departing from the spirit and scope of the disclosed implementations.

FIG. 1 illustrates an overview method for multiple object tracking, performed in accordance with one or more embodiments.

DETAILED DESCRIPTION

Figure 2:
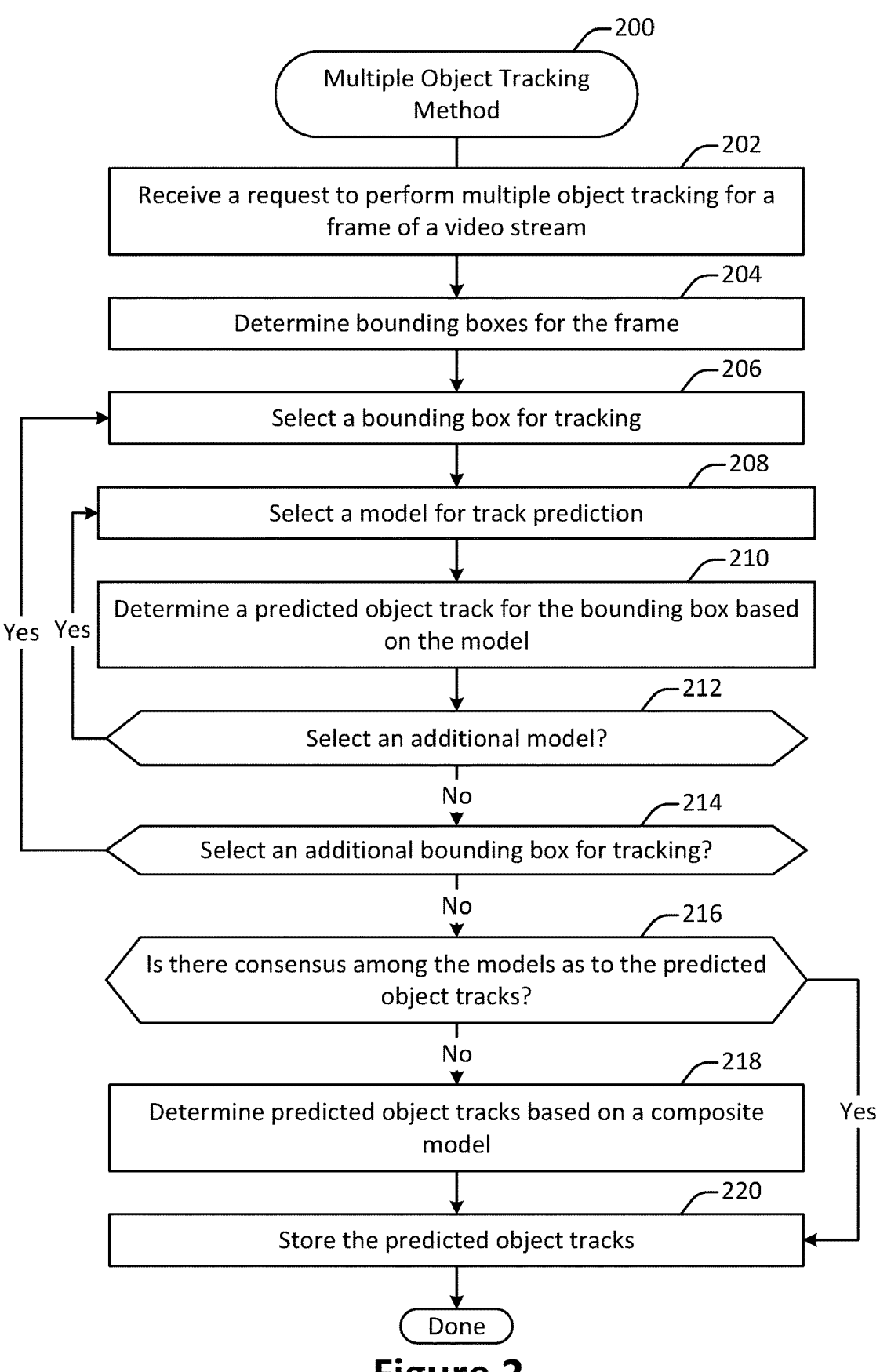
FIG. 2 illustrates a method for multiple object tracking, performed in accordance with one or more embodiments.

Techniques and mechanisms described herein provide for the tracking of one or more objects across multiple video frames. In some embodiments, two or more different models may be separately applied to track an object across multiple video frames. A model may be dynamically evaluated for a frame or group of frames by determining a performance metric for the model, for instance on the level of a frame or group of frames. Then, two or more models may be fused together using a weighting scheme based at least in part on performance metrics for the different models.

Different models may be more or less suitable for tracking different types of objects and/or tracking objects in different situations. Accordingly, many conventional MOT techniques involve stacking or fusing different models. However, fusing is typically performed in a static fashion by using averages and other fixed combination techniques. The performance of static fusing methods is very poor in complex situations that involve challenges such as occlusions, variable scene illumination, nonlinear motion, frequent entries and exits of objects. The poor performance of these models is reflected by issues such as frequent object ID switching and lost tracks.

In contrast to conventional techniques, techniques and mechanisms described herein provide for a dynamic fusing approach in which the use of models is tailored depending on the context. Such techniques and mechanisms allow the use of two or more models for tracks construction by matching the detected objects in the current frame to their corresponding tracks (i.e. the set of positions of the detected object in the previous frames).

In some implementations, the use or not of a given model as well as the determination of the importance of a given model among the set of used models may be dynamically determined (e.g., at each frame), for instance by evaluating how appropriate the model's performance is to the matching task for the current frame. The appropriateness of a given model may be determined at least in part using information about the situations where the model tends to perform well or poorly. Such information may be coded as a metric that is used to dynamically compute (e.g., at each frame) the weight of the model attached to it.

According to various embodiments, two or more models for object tracking may be combined based on their expected performance. For example, object tracking may involve the application of both an appearance model and a motion model. For each frame or group of frames, the expected performance of the appearance model and the motion model may each be determined. An appropriate performance metric for the appearance model may depend on the degree of similarity between the objects of the same frame, using for instance the cosine similarity between the vectors encoding the appearance of the objects. An appropriate metric for the motion model may depend on the degree of crowdedness of the scene, using for instance the distance between the centroids of the bounding boxes.

In some embodiments, a model weight may be determined based on the performance metric. For example, a performance metric may measure a negative impact, in which case a model weight may be inversely proportional to the metric. That is, the higher the metric, the lower the weight. In the example discussed in the previous paragraph, increased similarity between objects of the same frame may lower the weight of the appearance model, while increased crowdedness may lower the weight of the motion model.

According to various embodiments, techniques and mechanisms described herein may allow for any suitable number of models to be aggregated into a single procedure in which models receive higher weights when they positively impact object tracking precision and lower weights when they do not. Further, the system may support various types and combinations of metrics for different models.

Object tracking is a fundamental aspect of many video processing systems, such as surveillance systems. Accordingly, embodiments of techniques and mechanisms described herein may improve the functioning of such systems by providing for increased object tracking precision. Such improvements may manifest as a lower error rate when tracking objects across frames in a video stream.

FIG. 1 illustrates an overview method 100 for multiple object tracking, performed in accordance with one or more embodiments. According to various embodiments, the method 100 may be performed at any suitable computing device. For example, the method 100 may be performed at a surveillance system configured to control one or more cameras. As another example, the method 100 may be performed at a smart camera, or at a computing device that receives data from a camera.

A bounding box for an object within a frame of a video stream is determined at 102. The term "bounding box" refers to a region of an image that defines a location of an object. In some embodiments, the bounding box may be rectangular. Alternatively, or additionally, non-rectangular bounding boxes may be used.

According to various embodiments, a bounding box may be determined by applying one or more of a variety of suitable image processing procedures to the frame. For example, an object detection algorithm may be applied to the frame. The object detection algorithm may identify a region of an image that corresponds to a particular object. Object detection may rely, for instance, on identifying lines, corners, shapes, and/or other low-level features. Alternatively, or additionally, object detection may rely on pattern recognition algorithms that identify objects such as human beings, animals, or vehicles based on characteristics common to these types of objects.

Object tracks for the bounding box are determined at 104 by applying two or more object tracking models to the video stream. According to various embodiments, various types of tracking models may be used. For instance, an appearance tracking model may track objects based on their visual characteristics, while a motion tracking model may track objects based on their location within the frame.

A respective performance metric for each of the two or more object tracking models is determined at 106. According to various embodiments, an object tracking model may be associated with a performance metric that indicates a predicted performance level for the object tracking model under a particular set of conditions. For example, a performance metric may depend on characteristics such as the crowdedness of a frame.

A designated object track is selected for the bounding box at 108 from the two or more object tracks. According to various embodiments, the designated object track may be selected based at least in part on the performance metrics determined at 106. For example, the designated object track may be selected by weighting the tracks based on the performance metrics associated with the object models that produced the tracks, and then selecting the object tracking having the highest weight.

For expositional clarity, the method 100 shown in FIG. 1 is described as being applied to track a single object across different frames in a video stream. However, the method 100 may be applied to track any number of objects across different frames in a video stream.

FIG. 2 illustrates a method 200 for multiple object tracking, performed in accordance with one or more embodiments. According to various embodiments, the method 200 may be performed on a computing device such as the device 500 shown in FIG. 5.

A request to perform multiple object tracking for a frame of a video stream is received at 202. In some embodiments, the request may be generated manually, for instance based on user input. Alternatively, the request may be generated automatically and/or dynamically. For instance, the request may be generated as part of a larger video analysis methodology, such as a video in-painting process in which objects are removed from a video stream.

In particular embodiments, the method 200 may be performed for each successive frame in a video stream. Alternatively, the method 200 may be performed periodically. For example, the method 200 may be performed for key frames within a video stream. As another example, the method 200 may be performed at a given rate, such as once per every five frames.

One or more bounding boxes for the frame are determined at 204. According to various embodiments, bounding boxes for a frame may be determined via any of a variety of suitable methods. For instance, bounding boxes may be determined via logistic regression, histogram of oriented gradient (HOG), convolutional neural network (CNN), region-based convolutional neural networks (R-CNN), single-shot detector, You Only Look Once (YOLO), or any suitable bounding box detection procedure.

A bounding box is selected for tracking at 206. A model for track prediction is selected at 208. According to various embodiments, bounding boxes and models may be selected for analysis in any suitable order. For example, bounding boxes and models may be selected for analysis in a pre-defined sequence, in parallel, or according to another ordering.

A predicted object track is determined for the bounding box at 210 based on the model. According to various embodiments, any of a variety of object tracking models may be employed. For example, multiple object tracking may involve motion models, appearance models, other models, or some combination thereof. Examples of such models may include, but are not limited to: Generic Object Tracking Using Regression Networks (GOTURN), Recurrent You Only Look Once (ROLO), Simple Online Real-Time Tracker (SORT), DeepSORT, SiamMask, Joint Detection and Embedding (JDE), and Tracktor++. Techniques and mechanisms described herein are consistent with the group of different models identified above, other models, and/or different instances of the same model trained or parameterized in different ways.

A determination is made at 212 as to whether to select an additional model. If an additional model is not selected, then at 214 a determination is made as to whether to select an additional bounding box for tracking. According to various embodiments, the process many continue until all bounding boxes selected at 206 and models used for track prediction have been identified.

A determination is made at 216 as to whether there is consensus among the models as to the predicted object tracks. According to various embodiments, the determination may involve identifying a correspondence between bounding boxes and object tracks for each model, and then determining whether those correspondences are the same across each models.

In some implementations, a determination may be made as to whether a partial consensus exists. In a partial correspondence, all models may agree on a correspondence between bounding box and track for one or more of the bounding boxes, while also disagreeing on a correspondence between bounding box and track for a different one or more of the bounding boxes. In such a configuration, the agreed upon tracks may be employed for the bounding box or boxes where a consensus exists, and a composite model may be used to determine predicted object tracks for bounding boxes where no such consensus exists.

If consensus does not exist, then at 218 predicted object tracks are determined based on a composite model. Additional details related to the determination of predicted object tracks are discussed with respect to the method 300 shown in FIG. 3.

The predicted object tracks are stored at 220. Additional details related to the storage of predicted object tracks are discussed with respect to the method 400 shown in FIG. 4.

According to various embodiments, the operations shown in FIG. 200 may be performed in an order different than that shown. For example, operations 206 and 208 may performed in the reverse order, as well as operations 212 and 214.

Figure 3:
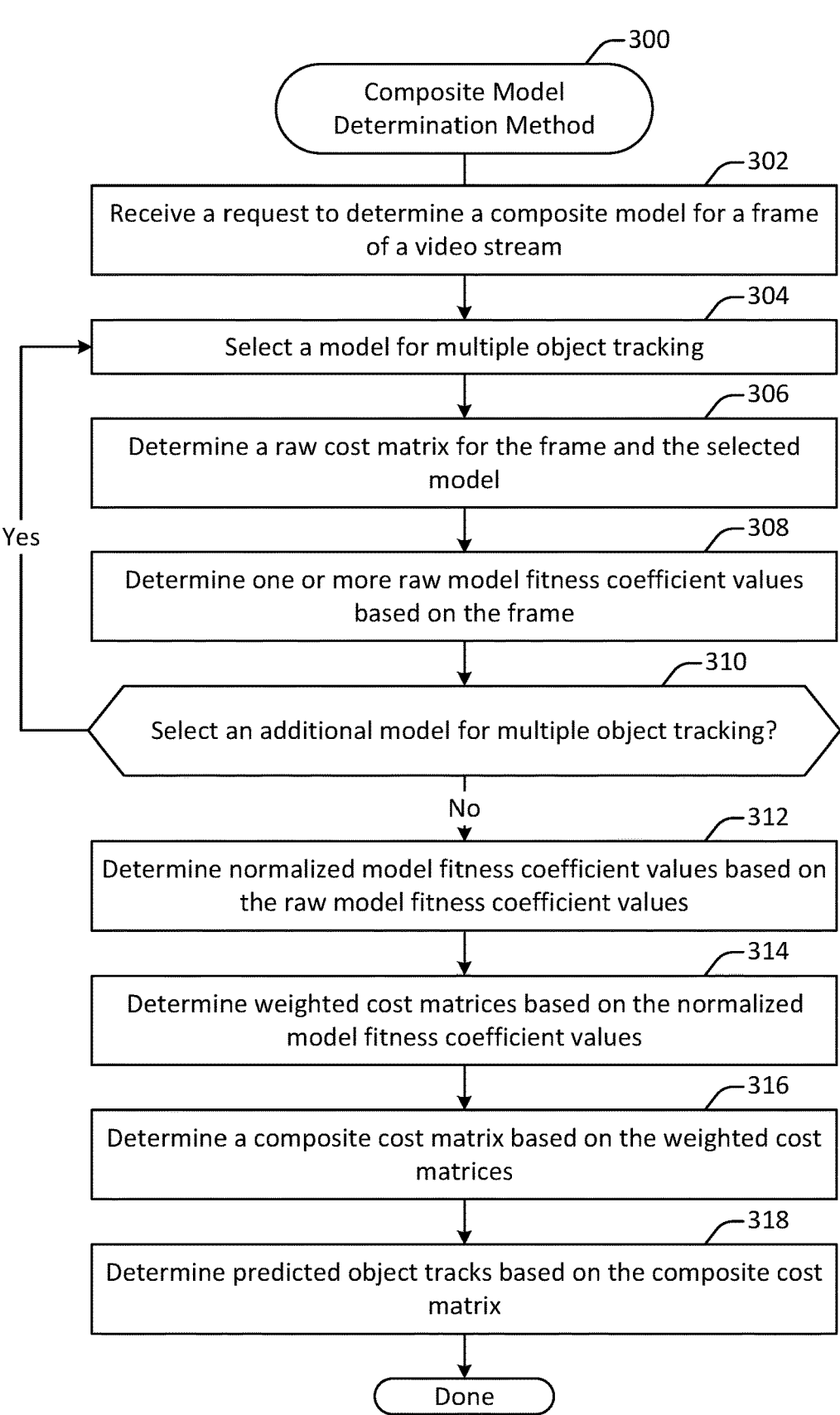
FIG. 3 illustrates a method for determining a composite model, performed in accordance with one or more embodiments.

FIG. 3 illustrates a method 300 for determining a composite model, performed in accordance with one or more embodiments. According to various embodiments, the method 200 may be performed on a computing device such as the device 500 shown in FIG. 5.

A request to determine a composite model for a frame of a video stream is received at 302. According to various embodiments, the request may be generated as part of a multiple object tracking procedure. For instance, the request may be generated as discussed with respect to the operation 208 shown in FIG. 2, when different models disagree as to the object track for one or more bounding boxes.

A model is selected for multiple object tracking at 304. According to various embodiments, any and all methods employed during the performance of the method 200 shown in FIG. 2 may be selected. For instance, models may be selected where there was at least some disagreement as to the object track for at least one bounding box. Models may be selected in any suitable order. For instance, models may be selected in sequence, in parallel, or in accordance with a pre-determined ordering.

A raw cost matrix for the frame is determined at 306 using the selected model. According to various embodiments, a raw cost matrix may identify a distance between one or more bounding boxes included in a current frame and one or more bounding boxes of existing tracks. That is, a value corresponding with row i and column j of a raw cost matrix may identify a distance between bounding box i in the current frame and a bounding box in existing track j, for a particular model.

According to various embodiments, any of various approaches may be used to calculate the distance values. For example, a distance value may be calculated using a cosine similarity measure as applied to a vector representation of the bounding boxes. As another example, a distance measure may be calculated as an intersection over union that identifies the area of overlap between the two bounding boxes as a portion of the union of the two bounding boxes. A similarity measure may be determined as, for instance, a distance value subtracted from one.

An existing track may be associated with more than one bounding box, for instance corresponding with different frames of a track. Accordingly, a similarity value between an existing track and a bounding box of the current frame may be determined in any of various ways. For example, the similarity value may be determined based on the maximum similarity of the bounding box of the current frame with any bounding box associated with the existing track. For instance, such an approach may be appropriate when employing an appearance model. As another example, the similarity value may be determined based on the similarity between the bounding box associated with the current frame and the bounding box for an existing track associated with an immediately preceding frame. For instance, such an approach may be appropriate when employing a motion model.

One or more raw model fitness coefficient values are determined at 308 based on the frame. In some embodiments, a raw model fitness coefficient value may indicate a quality or fitness of a particular model when applied to the current frame, as estimated or predicted based at least in part on one or more characteristics of the current frame.

According to various embodiments, a raw model fitness coefficient value may be determined based on the cost matrix. The raw model fitness coefficient value may be determined in a model-specific way. For example, the raw model coefficient value may be based on appearance similarity for an appearance model. As another example, the raw model coefficient value may be based on crowdedness for a motion frame. For instance, crowdedness may be determined based on, for instance, factors such as the number, size, and proximity of bounding boxes within the frame.

In particular embodiments, a raw model fitness coefficient value and/or a raw cost matrix may be determined for a set of temporally proximate frames rather than for an individual frame. In this way, temporal changes in a video stream may be smoothed across multiple frames.

A determination is made at 310 as to whether to select an additional model for multiple object tracking. According to various embodiments, as discussed with respect to operation 304, models may be analyzed in any suitable order, in sequence or in parallel.

Normalized model fitness coefficient values are determined at 312 based on the raw model fitness coefficient values. According to various embodiments, the normalized model fitness coefficient values may be determined by scaling the raw model fitness coefficient values determined at 308 to a common scale. For example, the raw model fitness coefficient values may each be scaled to a value between zero and one.

Weighted cost matrices are determined at 314 based on the normalized model fitness coefficient values. In some embodiments, a weighted cost matrix may be determined by multiplying the values within a raw cost matrix for a model by the normalized model fitness coefficient value for that model.

A composite cost matrix is determined at 316 based on the weighted cost matrices. According to various embodiments, the composite cost matrix may be determined by combining the weighted cost matrices according to a combination function. For instance, the weighted cost matrices may be added together. In this way, each value of the composite cost matrix may represent a distance between a bounding box in the current frame and an existing track that reflects the input of all models, weighted based on the quality of each model for the frame as determined based on the model fitness coefficient values.

Predicted object tracks are determined at 318 based on the composite cost matrix. In some embodiments, a predicted object track for a bounding box may be determined based on which existing track is associated with the lowest cost in the composite cost matrix. Alternatively, or additionally, one or more other selection criteria may be used. For example, a restriction that different bounding boxes may not be associated with the same existing track may be imposed. As another example, the composite cost matrix may be analyzed to identify a one-to-one correspondence between bounding boxes and tracks, for instance the correspondence having the small total cost.

Figure 4:
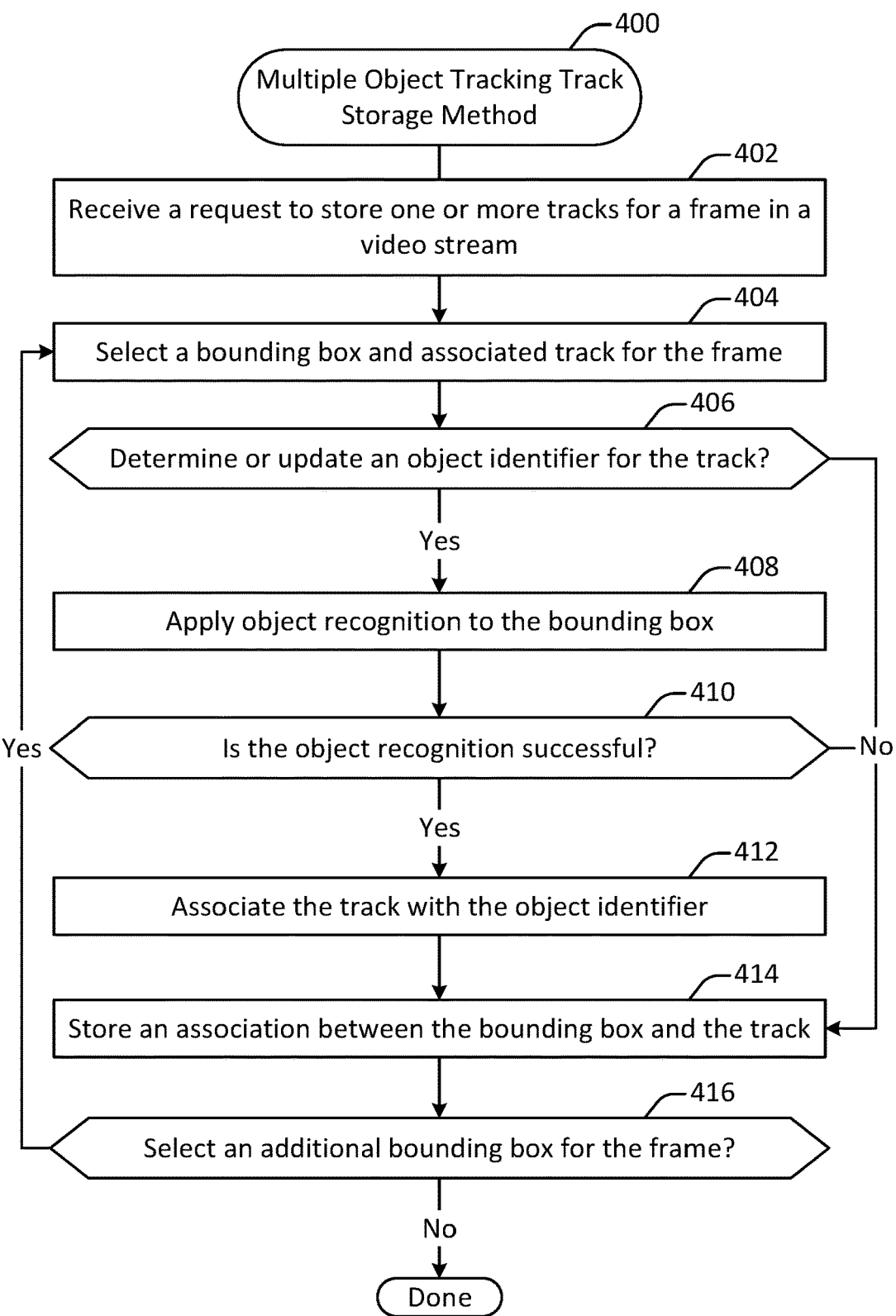
FIG. 4 illustrates a method for storing one or more object tracks, performed in accordance with one or more embodiments.

FIG. 4 illustrates a method 400 for storing one or more object tracks, performed in accordance with one or more embodiments. According to various embodiments, the method 400 may be performed to store an object track in association with a bounding box, after such an association is determined as discussed with respect to the methods 200 and 300 shown in FIGS. 2 and 3. The method 200 may be performed on a computing device such as the device 500 shown in FIG. 5.

A request to store one or more object tracks for a frame in a video stream is received at 402. In some implementations, the request may be generated as discussed with respect to the operation 220 shown in FIG. 2.

A bounding box and associated track for the frame are selected at 404. According to various embodiments, the track for a bounding box in a frame may be determined as discussed with respect to the methods 200 and 300 as shown in FIGS. 2 and 3.

A determination is made at 406 as to whether to update an object identifier for the track. According to various embodiments, each track may be associated with one or more identifiers that identify an object associated with the track. An identifier may identify any suitable information that may be associate with a track. For example, an identifier may indicate that the track corresponds to a person, an animal, or another type of object. As another example, an identifier may indicate that a track corresponds to a particular person, a particular animal, or a particular object. As yet another example, an identifier may indicate that a track corresponds to a particular type of person or object. For instance, a type of person in a video stream associated with a video surveillance application may be a home occupant, an intruder, or an unidentified individual.

According to various embodiments, any of various criteria may be used to determine whether to update an object identifier for a track. For example, an object identifier for a track may be determined if the track is not yet associate with an object identifier. As another example, object identification may be performed on a track periodically, such as every 30 frames. As yet another example, object identification may be performed on a track if a confidence value associated with object identification for the track is below a designated threshold. The particular criteria for use in determining whether to update an object identifier may be strategically determined based on the application.

Object recognition is applied to the bounding box at 408. According to various embodiments, one or more of any suitable object recognition algorithm may be applied to the bounding box and/or to the frame to recognize the object. For example, a person recognition algorithm may be applied to distinguish humans from other moving objects. As another example, a face recognition algorithm may be applied, for instance to distinguish occupants of a home from other individuals.

In particular embodiments, an object recognition algorithm may receive as input not only a particular frame and/or bounding box within a frame, but also other information. For instance, the algorithm may receive as input one or more other images of the object, such as image data from previous frames in the video stream.

A determination is made at 410 as to whether object recognition was successful. The determination may be made based at least in part on the output from the object recognition algorithm or algorithms applied at operation 408.

In some implementations, the determination made at operation 410 may be non-binary. For instance, the output of an object recognition algorithm may identify not a single object, but rather one or more objects that are each associated with a respective confidence value. As another example, different object recognition algorithms may identify different objects. In such a situation, an object track may be associated with more than object identifier. Alternatively, or additionally, an object identifier may be associated with metadata such as a confidence value.

The track is associated with the object identifier at 412. An association between the bounding box and the track is stored at 414. According to various embodiments, such associations may be stored in transient memory, in a non-transitory storage medium, in a network-accessible storage location, or in any other suitable way.

A determination is made at 416 as to whether to select an additional bounding box for the frame. According to various embodiments, additional bounding boxes may be selected until all bounding boxes in the frame have been processed. As discussed with respect to the operation 404, bounding boxes may be analyzed in parallel or in sequence, and in any suitable order.

Figure 5:
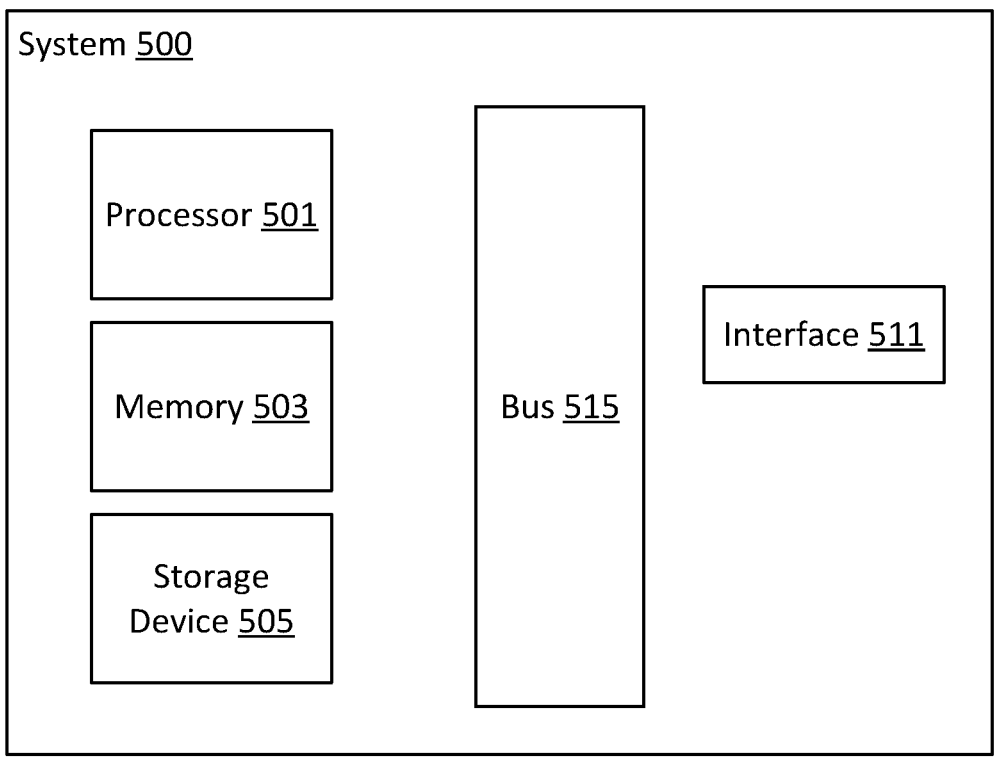
FIG. 5 illustrates one example of a computing device, configured in accordance with one or more embodiments.

FIG. 5 illustrates one example of a computing device 500, configured in accordance with one or more embodiments. According to various embodiments, a system 500 suitable for implementing embodiments described herein includes a processor 501, a memory module 503, a storage device 505, an interface 511, and a bus 515 (e.g., a PCI bus or other interconnection fabric.) System 500 may operate as variety of devices such as an application server, a database server, or any other device or service described herein. Although a particular configuration is described, a variety of alternative configurations are possible. The processor 501 may perform operations such as those described herein. Instructions for performing such operations may be embodied in the memory 503, on one or more non-transitory computer readable media, or on some other storage device. Various specially configured devices can also be used in place of or in addition to the processor 501. The interface 511 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventor. While various implementations have been described herein, it should be understood that they have been presented by way of example only, and not limitation. For example, some techniques and mechanisms are described herein in the context of tracking multiple objects within video streams. However, the techniques of the present invention apply to a wide variety of computer vision applications, such as tracking objects within sequences of still images. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:

determining a bounding box around an object within a designated frame of a plurality of frames within a video stream;

determining a first object track and a second object track for the object from a plurality of object tracks by applying an appearance-based tracking model and a motion-based object tracking model to the video stream, each of the first and second object tracks identifying a correspondence between bounding boxes for the object across different ones of the plurality of frames;

determining a plurality of raw performance metrics based at least in part on one or more visual features within the designated frame, the plurality of raw performance metrics including a first model fitness coefficient corresponding to the first object tracking model and measuring appearance similarity for the designated frame, the plurality of raw performance metrics including a second model fitness coefficient corresponding to the second object tracking model and measuring crowdedness of the designated frame;

selecting an object tracking model for the object based at least in part on the plurality of raw performance metrics;

selecting a designated object track of the first and second object tracks based on the object tracking model; and storing the designated object track on a storage device.

2. The method recited in claim 1, the method further comprising:

determining whether the two or more object tracks are different, wherein the plurality of raw performance metrics are determined when it is determined that the two or more object tracks are different.

3. The method recited in claim 1, the method further comprising:

determining a plurality of normalized performance metrics based on the raw performance metrics, the normalized performance metrics being located on a designated performance metric scale.

4. The method recited in claim 1, the method further comprising:

determining a plurality of raw cost matrices for the designated frame, each of the raw cost matrices corresponding to a respective one of the object tracking models and identifying a respective distance between one or more bounding boxes included in a current frame and one or more bounding boxes of existing tracks.

5. The method recited in claim 4, wherein a designated one of the raw cost matrices includes a plurality of values, each of the values corresponding with a respective one of the plurality of object tracks and a respective bounding box within the designated frame.

6. The method recited in claim 4, the method further comprising:

determining a plurality of weighted cost matrices for the designated frame, each of the weighted cost matrices corresponding with a respective raw cost matrix, each of the weighted cost matrices being weighted based on a respective weighting factor, the weighting factors determined based on the plurality of raw performance metrics.

7. The method recited in claim 1, the method further comprising:

determining an object identifier for the bounding box by applying an object recognition algorithm to all or a portion of the designated frame.

8. The method recited in claim 1, wherein a designated one of the performance metrics is determined for an individual frame.

9. The method recited in claim 1, wherein a designated one of the performance metrics is determined for a group of temporally proximate frames.

10. A system comprising a processor and a storage device, the processor configured to perform a method comprising:

determining a bounding box around an object within a designated frame of a plurality of frames within a video stream;

determining a first object track and a second object track for the object from a plurality of object tracks by applying an appearance-based tracking model and a motion-based object tracking model to the video stream, each of the first and second object tracks identifying a correspondence between bounding boxes for the object across different ones of the plurality of frames;

determining a plurality of raw performance metrics based at least in part on one or more visual features within the designated frame, the plurality of raw performance metrics including a first model fitness coefficient corresponding to the first object tracking model and measuring appearance similarity for the designated frame, the plurality of raw performance metrics including a second model fitness coefficient corresponding to the second object tracking model and measuring crowdedness of the designated frame;

selecting an object tracking model for the object based at least in part on the plurality of raw performance metrics;

selecting a designated object track of the first and second object tracks based on the object tracking model; and storing the designated object track on a storage device.

11. The system recited in claim 10, the method further comprising:

determining whether the two or more object tracks are different, wherein the plurality of raw performance metrics are determined when it is determined that the two or more object tracks are different.

12. The system recited in claim 10, the method further comprising:

determining a plurality of normalized performance metrics based on the raw performance metrics, the normalized performance metrics being located on a designated performance metric scale.

13. The system recited in claim 10, the method further comprising:

determining a plurality of raw cost matrices for the designated frame, each of the raw cost matrices corresponding to a respective one of the object tracking models and identifying a respective distance between one or more bounding boxes included in a current frame and one or more bounding boxes of existing tracks.

14. The system recited in claim 13, wherein a designated one of the raw cost matrices includes a plurality of values, each of the values corresponding with a respective one of the plurality of object tracks and a respective bounding box within the designated frame.

15. The system recited in claim 13, the method further comprising:

determining a plurality of weighted cost matrices for the designated frame, each of the weighted cost matrices corresponding with a respective raw cost matrix, each of the weighted cost matrices being weighted based on a respective weighting factor, the weighting factors determined based on the plurality of raw performance metrics.

16. The system recited in claim 10, the method further comprising:

determining an object identifier for the bounding box by applying an object recognition algorithm to all or a portion of the designated frame.

17. One or more non-transitory computer readable media having instructions stored thereon for performing a method, the method comprising:

determining a bounding box around an object within a designated frame of a plurality of frames within a video stream;

determining a first object track and a second object track for the object from a plurality of object tracks by applying an appearance-based tracking model and a motion-based object tracking model to the video stream, each of the first and second object tracks identifying a correspondence between bounding boxes for the object across different ones of the plurality of frames;

determining a plurality of raw performance metrics based at least in part on one or more visual features within the designated frame, the plurality of raw performance metrics including a first model fitness coefficient corresponding to the first object tracking model and measuring appearance similarity for the designated frame, the plurality of raw performance metrics including a second model fitness coefficient corresponding to the second object tracking model and measuring crowdedness of the designated frame;

selecting an object tracking model for the object based at least in part on the plurality of raw performance metrics;

selecting a designated object track of the first and second
   object tracks based on the object tracking model; and
storing the designated object track on a storage device.

* * * * *